(12) United States Patent
Banatre et al.

(10) Patent No.: US 7,881,662 B2
(45) Date of Patent: Feb. 1, 2011

(54) SYSTEM FOR INFORMATION CONTEXTUAL DISTRIBUTION SIMULTANEOUSLY IN A PUBLIC AND INDIVIDUAL MODE

(75) Inventors: Michel Banatre, La Fresnais (FR); Mathieu Becus, Rennes (FR); Paul Couderc, Rennes (FR)

(73) Assignee: Inria Institut National de Recherche En Informatique Et En Automatique, Le Chesnay Cedex (FR)

(*) Notice: Subject to any disclaimer, the term of this patent is extended or adjusted under 35 U.S.C. 154(b) by 625 days.

(21) Appl. No.: 11/918,504

(22) PCT Filed: Apr. 13, 2006

(86) PCT No.: PCT/FR2006/000809

§ 371 (c)(1),
(2), (4) Date: Mar. 3, 2008

(87) PCT Pub. No.: WO2006/108960

PCT Pub. Date: Oct. 19, 2006

(65) Prior Publication Data

US 2009/0047899 A1 Feb. 19, 2009

(30) Foreign Application Priority Data

Apr. 13, 2005 (FR) .................................. 05 03678
Feb. 6, 2006 (FR) .................................. 06 01031

(51) Int. Cl.
*H04B 7/185* (2006.01)

(52) U.S. Cl. .......................... 455/13.1; 455/7; 455/11.1

(58) Field of Classification Search ................ 455/3.02, 455/427, 7, 11.1, 12.1, 13.1, 13.2, 16; 370/226, 370/293, 246, 274, 279, 315, 316, 492, 501
See application file for complete search history.

(56) References Cited

U.S. PATENT DOCUMENTS 6,359,714 B1 * 3/2002 Imajo .......................... 398/178
2002/0135515 A1 9/2002 Rankin et al.

(Continued)

FOREIGN PATENT DOCUMENTS

EP 0 971 303 A2 1/2000

(Continued)

OTHER PUBLICATIONS

International Search Report, dated Oct. 11, 2006, corresponding to PCT/FR2006/000809.

*Primary Examiner* — Dominic E Rego
(74) *Attorney, Agent, or Firm* — Christie, Parker & Hale, LLP (57) ABSTRACT

The inventive information distributing system (1), in particular for railway stations or airports, comprises a control unit (5) delivering information items selected according to a first key value to a main distributor (3), a short-range communications relay (7) for establishing connections with mobile terminals (11, 13, 15). Said control unit comprises a relay interface and a control module carrying out a function of general distribution to the distributor, an inventory function for interacting with the terminals by storing state data received therefrom and by setting a second key value according to a state data sub-group and a particular distribution function for transmitting the information items selected according to the second key value to the terminals having the second sub-group state data.

26 Claims, 8 Drawing Sheets

U.S. PATENT DOCUMENTS

| | | |
|---|---|---|
| 2004/0087273 A1 | 5/2004 | Perttila et al. |
| 2005/0096045 A1* | 5/2005 | Palmer et al. ............... 455/423 |
| 2005/0096066 A1* | 5/2005 | Lee ......................... 455/456.1 |
| 2005/0107034 A1* | 5/2005 | Lee et al. ................... 455/11.1 |
| 2005/0153705 A1* | 7/2005 | Gramakov et al. ....... 455/456.1 |
| 2005/0177632 A1* | 8/2005 | Yach et al. .................. 709/224 |
| 2005/0266802 A1* | 12/2005 | Wolf et al. .............. 455/67.11 |

FOREIGN PATENT DOCUMENTS

| | | |
|---|---|---|
| EP | 1 158 820 A1 | 11/2001 |
| EP | 1 168 713 A2 | 1/2002 |
| WO | WO 94/11967 | 5/1994 |
| WO | WO 00/70504 | 11/2000 |
| WO | WO 03/055149 A1 | 7/2003 |

* cited by examiner

| IdTi | D1Ti | ... | ... | DjTi |
|------|------|-----|-----|------|
| IdT1 | D1T1 | ... | ... | DjT1 |
| IdT2 | D1T2 | ... | ... | DjT2 |
| IdT3 | D1T3 | ... | ... | DjT3 |

| All flights departing within the next two hours | Key value KVal1 "German language" |
|---|---|
| All "Air France" ® flights departing within the next two hours | Key value KVal2 "French language" |

SYSTEM FOR INFORMATION CONTEXTUAL DISTRIBUTION SIMULTANEOUSLY IN A PUBLIC AND INDIVIDUAL MODE

CROSS-REFERENCE TO RELATED APPLICATION

This application is a National Phase Patent Application of International Application Number PCT/FR2006/000809, filed on Apr. 13, 2006, which claims priority of French Patent Application Number 0503678, filed on Apr. 13, 2005, and French Patent Application Number 0601031, filed on Feb. 6, 2006.

The invention relates to a system for distributing information.

Such systems typically comprise at least one main distributor capable of distributing information and a control unit capable of causing the main distributor to deliver selected information drawn from selected stored data.

Systems of this kind are known which are provided for example in railway stations or airports. These systems frequently comprise as the main distributor a video screen or a board with shutters when the information is to be distributed in visual form. When the information is to be provided in audible form the main distributor takes the form of a loudspeaker system that broadcasts sound announcements. Systems of this kind are moreover very often redundant and comprise both a loud speaker system and video screens.

The information relates in particular to timetables for the arrival and departure of transport means, information as to the platforms for the departure and arrival of trains, in the case of railway stations, or the destination or origin of flights, in the case of airport systems.

The data constituting this information are stored in an organised manner in a memory and can be selected according to at least one first criterion depending on a first key value.

For example, the first criterion may be a date criterion and the first key value may be the day, so as to display, for example, all the trains arriving at or departing from a station on a given day.

In a more elaborate fashion, the first criterion may be a timetable criterion defining a time slot, for example, two hours, starting from the present time, taken as the key value. Thus, all the flights leaving an airport terminal or arriving there within two hours are displayed.

Sometimes, particularly in locations that are travel hubs for foreign places, such as airports or certain stations, information is provided in a foreign language such as English, for example. Most frequently, this information, when given in visual form, is distributed by means of additional distribution equipment or screens, so that the same information is available in French on one screen and in English on an adjacent screen. When the information is in audio form this distribution is provided by alternating and regular distribution of announcements in both languages.

Apart from the costs generated by this arrangement of systematic duplicated provision and the nuisance caused by this alternating sound distribution (inaudible or misheard timetables, listener fatigue caused by the repetition of announcements, etc), the information distributed is not always suitable for all the public.

In the example described above, some travellers cannot speak either English or French and are incapable of understanding the information thus distributed, whether it is in audible or visual form.

Of course, with the above-mentioned systems, it is not possible to multiply the screens and spoken announcements so as to suit the particular case of every possible traveller.

Moreover, it is useful to provide a main distribution of information in a form, for example in a particular language, that satisfies the majority of travellers or, alternatively, a typical traveller (for example a French-speaking traveller in a French airport).

More generally, there is a problem with systems for distributing information, which is to make the information accessible to all the public while catering to possible individual cases within this public without the need to use expensive and complex solutions based on multiplying the distribution equipment.

The invention sets out to improve the situation and in particular to solve the above problem by proposing a system of the type described hereinbefore which further comprises a short range communications relay associated with a physical perimeter and capable of establishing connections within this perimeter with mobile terminals equipped with homologous short range communication means. The control unit comprises an interface with this communications relay as well as a control module designed to carry out functions which affect both the physical perimeter and the main distributor. These functions comprise a general distribution function to the main distributor, an inventory function capable of reacting to the presence of mobile terminals within said perimeter while storing respective state data gathered from the mobile terminals and of establishing a second key value as a function of a subgroup of state data, and a particular distribution function capable of emitting, towards the mobile terminal or terminals having state data of the subgroup, selected information drawn from selected stored data in accordance with a second criterion depending on the second key value.

Thus, different information, at least different in form, can be distributed through the main distributor and through each of the mobile terminals so that the information can be adapted to all the individuals that make up the public and are present within the perimeter.

Further features and advantages of the invention will become apparent from a study of the following detailed description and the attached drawings, wherein.

The attached drawings may serve not only to supplement the invention but also to help to define it, as necessary.

Figure 1:
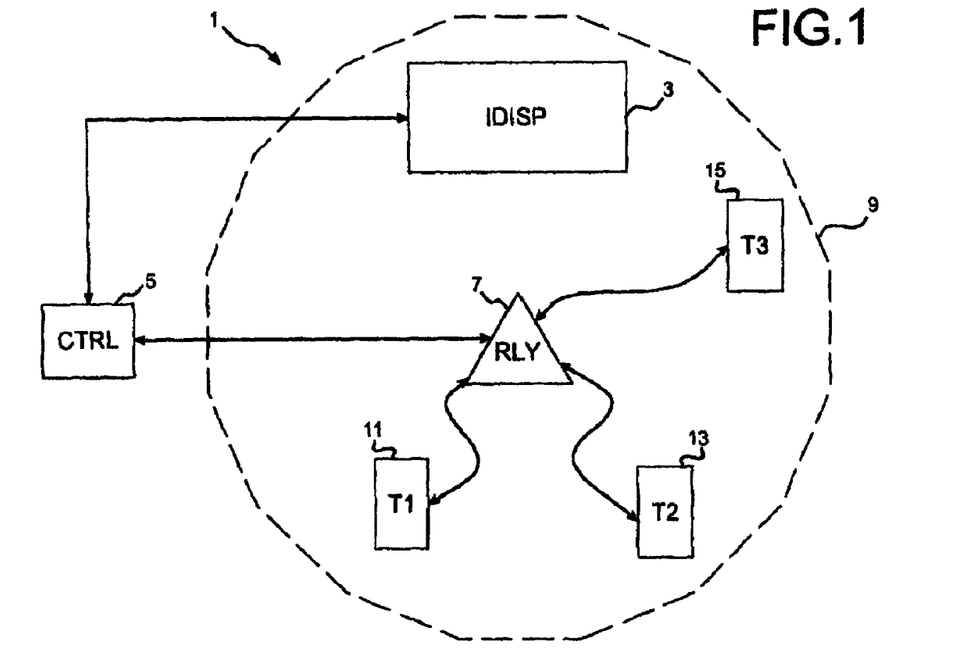
FIG. 1 is a diagram representing an information distribution system according to the invention.

The information distributing system 1 shown in FIG. 1 comprises a main distributor IDISP 3 capable of giving out information and a control unit CTRL 5, which are connected so as to exchange control signals. The distributor IDISP 3 may take the form of a public display means, for example a liquid crystal screen, a plasma screen or a shutter-type information board, capable of giving out visual information. The expression "visual information" here refers to information in the form of an image, video and/or text.

Alternatively, or additionally, the distributor IDISP 3 may comprise a public sound system, for example of the type provided with loudspeakers.

The connection between the distributor IDISP 3 and the control unit CTRL 5 may be of the wired type, such as a network cable, or of the wireless type using a short range radio transmission of the WIFI or Bluetooth type, for example. This connection may also be more complex and make use of certain communication technologies which are currently available, such as the internet.

The distributor IDISP 3 may itself consist of a network of distributors which may or may not be the same. Thus, the distributor IDISP 3 may consist of two plasma screens and a loudspeaker connected to the unit CTRL 5.

The system 1 further comprises a short range communications relay RLY 7 connected to the unit CTRL 5 by a wired or wireless connection. The relay RLY 7 is arranged so as to form a physical perimeter 9 inside which it is capable of establishing communication connections with mobile terminals Ti (the index i being equivalent to 1, 2 and 3 in FIG. 1) provided with compatible short range communication means. Only three terminals T1 11, T2 13 and T3 15 are shown in FIG. 1 but it will be appreciated that the system 1 can operate with a plurality of terminals, generically designated Ti.

The terminals Ti may be, for example, mobile phones provided with a communications module of the Bluetooth, Zigbee or WIFI standard, a personal electronic assistant (commonly referred to as PDA) fitted with such a module, a headset provided with a radio transmitter-receiver or an earpiece of the Bluetooth type. The terminals Ti 11, 13 and 15 are capable of giving out information, particularly in visual and/or sound form, transmitted through the relay RLY 7. By visual information is meant any kind of image, video or text. By sound information is meant a sound signal, music or a text read aloud.

Figure 2:
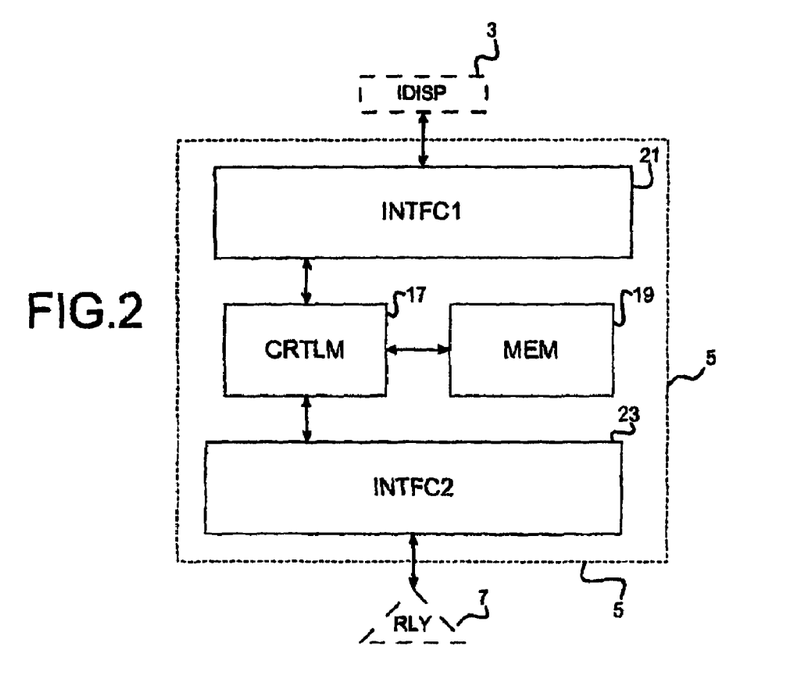
FIG. 2 is a diagram illustrating a control unit for the system in FIG. 1.

The unit CTRL 5 shown in FIG. 2 comprises a control module CTRLM 17 capable of executing the functions, a memory MEM 19 storing information in the form of organised data, a first interface INTFC1 21 communicating with the distributor IDISP 3 and a second interface INTFC2 23 communicating with the relay RLY 7.

In particular, the module CTRLM 17 is capable of interacting with the interface INTFC1 21 in order to execute functions which affect the distributor IDISP 3 and with the interface INTFC2 23 to execute functions which affect the perimeter 9. Thus, the module CTRLM 17 is capable of initiating the broadcasting of information stored in data form in the memory MEM 19 to the terminals Ti 11, 13, and 15 and the provision of such information to the distributor IDISP 3.

Moreover, the module CTRLM 17 is capable of implementing functions linked to the management of the data in the memory MEM 19 such as the reading, writing or sorting of data.

By way of example, the unit CTRL 5 may be in the form of a central computer unit comprising a wired network interface (typically Ethernet) which enables the unit CTRL 5 to be linked to the distributor IDISP 3 and a WIFI interface for connecting to the relay RLY 7, a hard disk being used to store the information data.

The unit CTRL 5 may also be in the form of a dedicated housing comprising a microprocessor, a memory, e.g. a FLASH type memory, a Bluetooth interface for connection to the relay RLY 7 and a serial interface for connection to the distributor IDISP 3.

Although the memory MEM 19 has been shown as belonging to the unit CTRL 5, it may be provided outside this unit and may be accessible by the module CTRLM 17 through a communications interface, for example a network interface (wired or wireless Ethernet, for example). For example, where a plurality of systems 1 are provided within a spatial entity such as a railway station or airport, they may share the same centralised memory MEM 19 which is accessible through a wireless network interface. There is then no need for the information to be duplicated.

Figure 3:
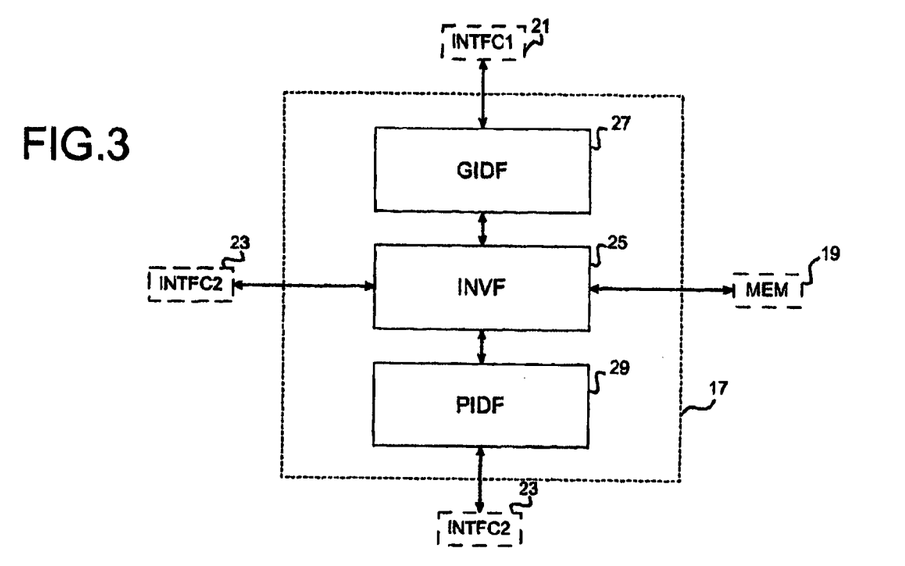
FIG. 3 is a diagram illustrating a control module for the control unit in FIG. 2.
Figure 4:
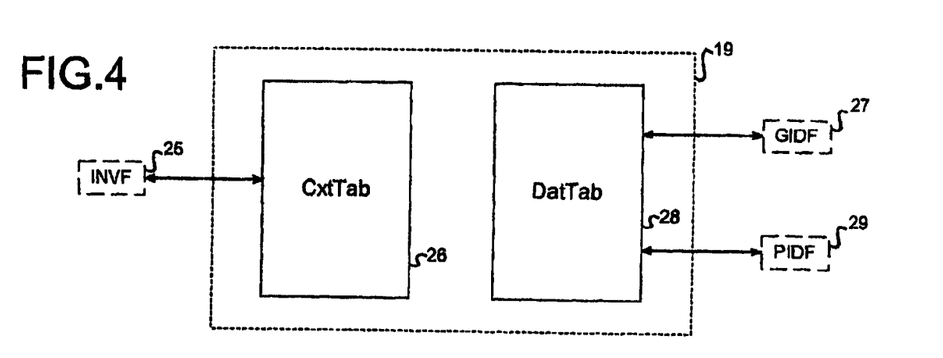
FIG. 4 is a diagram illustrating the structure of a memory for the control unit in FIG. 2.
Figure 5:
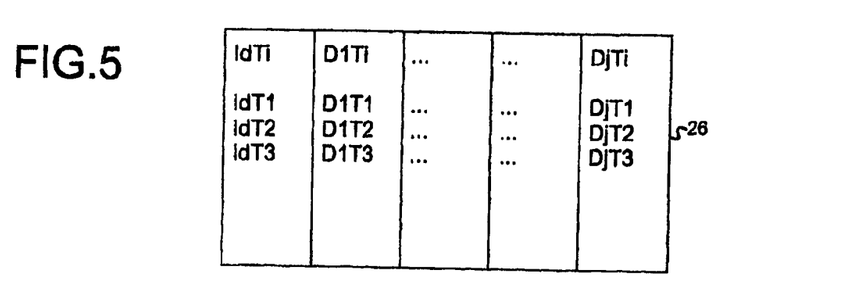
FIG. 5 is a diagram illustrating the structure of a context table for the memory in FIG. 4.
Figure 6:
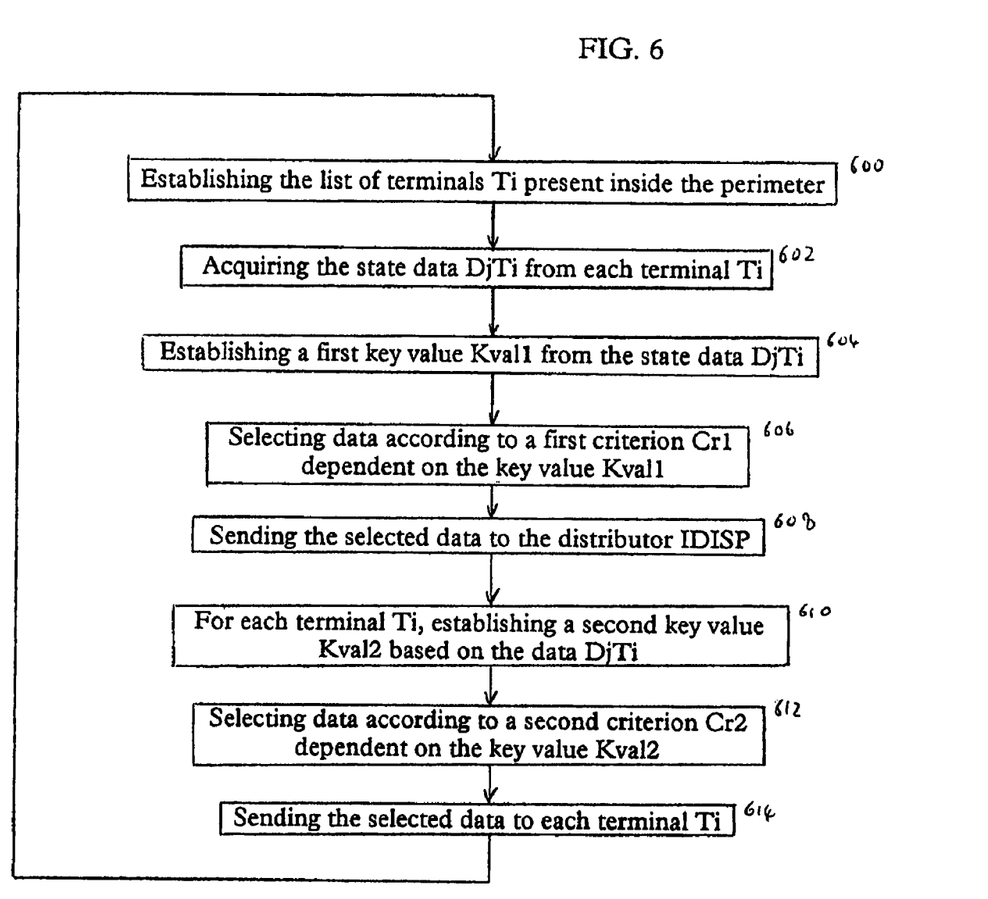
FIG. 6 is a flow chart illustrating the operation of the system in FIG. 1.

The operation of the system 1 will now be described by means of the flow chart in FIG. 6 and the diagrams in FIGS. 3, 4 and 5.

The module CTRLM 17 carries out an inventory function INVF 25 interacting with the relay RLY 7 via the interface INTFC2 23 in order to draw up a list of terminals Ti 11, 13 and 15 present within the perimeter 9 (step 600).

According to one embodiment, the function INVF 25 is capable of discovering the terminals Ti which have newly appeared within the perimeter 9 compared with the previous execution of this function INVF 25. The function INVF 25 interacts with the memory MEM 19 in order to store an identifier IdTi therein for each of these new terminals Ti. The identifier IdTi may comprise the number of the SIM card of the terminal Ti or any other information capable of unequivocally identifying the terminal Ti.

The function INVF 25 is thus capable of checking the presence of each of the terminals Ti which have previously been discovered within the perimeter 9. The identifiers of terminals Ti which are not present are deleted from the list.

The discovery of the new terminals Ti may be carried out implicitly or "in free mode", i.e. no particular action has to be taken for the user of a mobile terminal Ti to be discovered and to benefit from the distribution of information from the system 1. Once the list of terminals Ti has been drawn up, the function INVF 25 interacts with the interface INTFC2 23 to obtain, from each of the terminals Ti 11, 13 and 15 on the list, a set of state data DjTi relating to the terminal Ti. The index j here denotes a state data number. These state data DjTi are stored in the memory MEM 19 by correlation with the identifier IdTi in a context table CxtTab 26 illustrated in FIGS. 4 and 5.

The state data DjTi may comprise a first state data D1Ti. For example, the data item D1Ti comprises a data item for determining the operating language of the terminal Ti. The data item D1Ti may be, for example, a code identifying the mobile telephone operator for the telephone in question or, alternatively, the country in which it operates, or a code which directly identifies the language of the graphic and/or sound interface of the terminal Ti.

The state data DjTi may also comprise a second state data item D2Ti. For example, the data item D2Ti may comprise a data item for determining whether the user of the mobile terminal Ti suffers from any handicap and, if so, to determine the nature of the handicap (for example impaired vision or impaired hearing).

Of course, these are simply examples and other state data may be envisaged. The state data DjTi may be directly available at the terminal Ti or may be gathered and emitted through a specific module executed in the terminal Ti. If appropriate, a JAVA-type application may be integrated in terminals Ti for acquiring and/or emitting state data which are not available in standard fashion in the terminal. The state data DjTi may relate to the terminal Ti itself (operator identifier, model of the terminal, etc) or to the user (age, sex, etc) and/or to the preferences (interface language chosen, for example).

Steps 600 and 602 have been described separately for greater clarity but they may also occur simultaneously.

The function INVF 25 interacts with the context table CxtTab 26 to establish a first key value KVal1 on the basis of a subgroup of state data DjTi (step 604), in particular according to an absolute or relative majority logic.

For example, the function INVF 25 establishes, from the state data D1Ti, the first key value KVal1 as being the value of this state data item which is most represented in the table CxtTab 26. The value KVal1 may be directly the value of the state data item or a value obtained from the value of the state data item which is most represented or the value which is most represented associated with each value of the state data item.

For example, when the state data comprise a data item D1Ti indicating the nationality of the operator of a terminal Ti and the value of the data item D1Ti most represented is "Austrian", the function INVF 25 may determine as the value KVal1 a code which identifies the German language.

Of course, other subgroups and other key values may be obtained from the data DjTi.

In step 606, a general distribution function GIDF 27 of the module CTRLM 17 selects information data from a table of contents DatTab 28 of the memory MEM 19 based on a first criterion dependent on the value KVal1. The information data from the table DatTab 28 are stored in an organised manner so as to be accessible from interrogation criteria which can be implemented in the form of sorting and/or search functions. In particular, the information data in the table DatTab 28 may be stored in a database.

This first criterion may consist of the value KVal1 on its own or may also take account of other values which may or may not be linked to KVal1.

Optionally, the function INVF 25 may establish a first supplementary key value SKVal1 from a subgroup of state data. The nature of the value SKVal1 may be very different from the nature of the value KVal1, as will be seen further on.

For example, if the value KVal1 designates the German language, the first criterion may be provided such that the information data selected relate to information in the German language and of interest to a German-speaking individual.

Once the information data have been selected, the function GIDF 27 sends these data to the distributor IDISP 3 for transmission (step 608).

The function INVF 25 establishes, from state data subgroups DjTi, a second key value KVal2 for each identifier IdTi (step 610). The value KVal2 for the terminal Ti may similarly consist solely of the value of the data item DjTi for this terminal Ti, or not.

The value KVal2 may be obtained from the same state data subgroup on the basis of which the value KVal1 has been determined, or not. In other words, the values KVal1 and KVal2 may be connected with state indications of different types.

One particular information distribution function PIDF 29 selects information data contained in the table DatTab 28 according to a second criterion Cr2 dependent on the second key value KVal2, for each terminal Ti 11, 13 and 15. In addition, the function PIDF 29 sends the data thus selected to the terminals T1 11, 13 and 15, respectively, so that the information is reproduced on these terminals.

The first Cr1 and second Cr2 criteria for information selection may be of different kinds. For example, the criterion Cr1 may be drawn up such that all information relating to the value KVal1 is distributed whereas the criterion Cr2 may include supplementary exclusion criteria.

As before, the function INVF 25 may also establish a second supplementary key value SKVal2 on the basis of a state data subgroup. The nature of the value SKVal2 may be very different from that of the value KVal2. For example, the value KVal2 may relate to an indication of language whereas the value SKVal2 may relate to a form of information distribution (in audible or visual form).

After step 614, the process starts again from step 600 so as to establish a new value KVal1 or first modified key value. Between steps 614 and the restarted step 600, there may be a delay built into the process to prevent changes occurring too rapidly at the distributor IDISP 3.

In one embodiment, a first default key value may be pre-set which may be used conditionally by the function GIDF 27. This default key value may be used before the process starts at step 600, the default key value then acting as an initial value for the value KVal1. In one embodiment, the function GIDF 27 is executed after step 614, and any delay, with the first default key value for restarting the distribution IDISP 3.

The operation of the module CTRLM 17 may be seen as an organised series of instructions. The module CTRLM 17 may be used in the form of a program or microprogram intended to be run by a central computer unit or a microprocessor.

It will be noted that the first key value KVal1 is public by nature, in that it determines a criterion for selecting information which is common to all (or the majority of) the terminals Ti present within the perimeter 9, whereas the second key value KVal2, by contrast, is private by nature, in that it determines a criterion for selecting information which is particular to each terminal Ti.

Whatever the technology used by the relay RLY 7, the system 1 is advantageously provided so as to ensure continuity, or complementarity, of service. Thus, when the distributor IDISP 3 distributes new information data as a function of the first modified key value, the terminals Ti receive new information data virtually simultaneously. The qualifier "simultaneously" refers here to the users of the terminals Ti and indicates "virtually without any delay that can be perceived by a user".

When the relay RLY 7 operates using Bluetooth technology, a single Bluetooth unit may be devoted to discovering the new terminals Ti 11, 12 and 13 and to the communications between the terminals Ti and the relay RLY 7. Advantageously, the system 1 comprises a plurality of Bluetooth units. One Bluetooth unit can therefore be devoted entirely to discovering the new terminals Ti 11, 13 and 15, i.e. it does not participate in the communications. The system 1 therefore comprises a plurality BTCN of Bluetooth units used solely for communication with the terminals Ti.

The number BTCN of Bluetooth units to be integrated in the system 1 can be deduced from the performance envisaged for this system. The maximum delay DLY needed to switch the distributor IDISP 3 is a function of the number N of terminals Ti to which the information is to be sent, the number BTCN of Bluetooth units installed and the time needed CxD for establishing a Bluetooth connection. The delay DLY is represented for example by the formula (1):

$$DLY = \text{ceilinginteger}\{N/\min(BTCN,N)\} \times CxD \quad (1)$$

The function ceilinginteger associates a real number with the whole number immediately above it. For example ceilinginteger (3.75)=4.

The value of the time CxD is fixed by the choice of Bluetooth technology and is approximately 5 seconds.

The delay DLY can be calculated on the date t0 on which the connections to the terminals Ti are initiated.

The unit CTRL 5 is connected to a terminal Ti on a date ti. The timing delay DLYi communicated to the terminal Ti is given by formula (2):

$$DLYi=DLY-(ti-t0) \qquad (2)$$

The values of the delays DLY and DLYi are fixed by choice as being delays which allow good operation or acceptable operation of the system 1 for the users. By solving the formulae (2) and then (1) on the basis of the choice of delays DLY and DLYi and the predicted number of terminals Ti to be connected N, the number BTCN of Bluetooth units to be provided is obtained.

If the relay RLY 7 operates according to the WIFI standard, the delay DLY is given by formula (3).

$$DLY=N \times CxD \qquad (3)$$

The value of the time CxD is fixed by the choice of WIFI technology and is approximately 10 milliseconds (including a processing time). Consequently, the delay DLY is negligible for the users of the terminals Ti with the exception of cases where there are a large number N of terminals Ti.

In practice, formulae (1), (2) and (3) enable the dimensions of the system 1 to be adjusted so as to obtain the continuity or complementarity of service described hereinbefore.

A first example of the use of the invention will now be described. The system 1 is provided in a waiting area in an airport. The distributor IDISP 3 is in the form of a liquid crystal screen capable of displaying text-type information relating to the different flights departing from and arriving at the airport. The data relating to this information in different languages are stored in the memory MEM 19.

The relay RLY 7 is designed so that the perimeter 9 covers a zone that encompasses the distributor IDISP 3. The terminals Ti 11, 13 and 15 are in the possession of travellers whose nationalities are a priori different.

Figure 7:
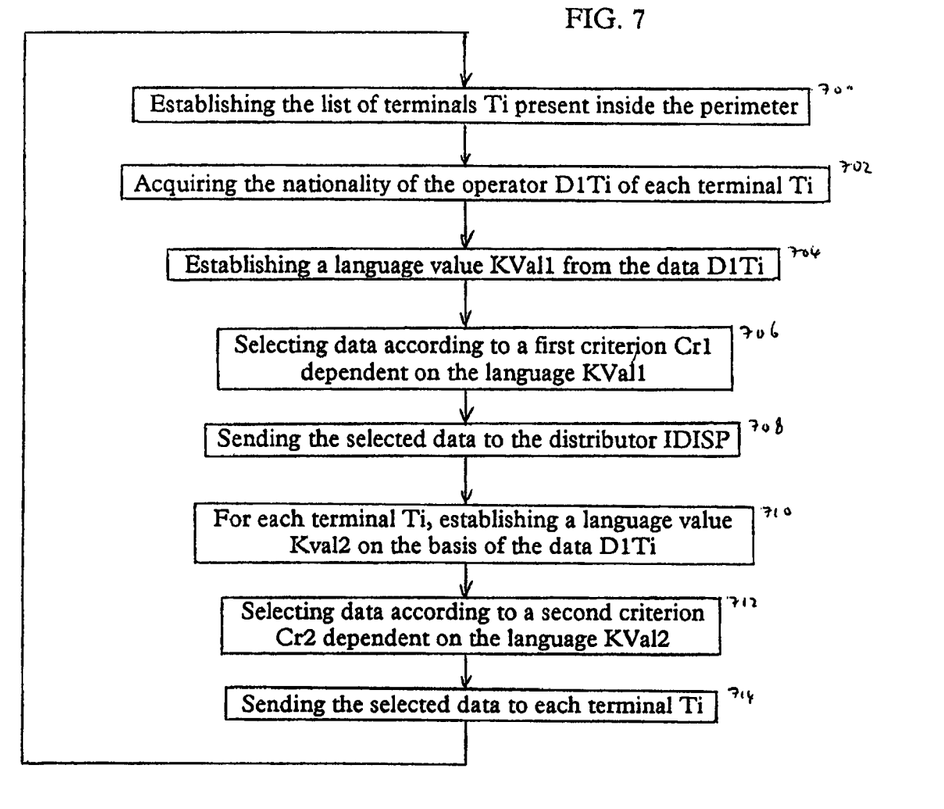
FIG. 7 is a flow chart illustrating the operation of the system in FIG. 1, in a particular embodiment.

The flowchart in FIG. 7 illustrates, in this particular case, the operation of the system 1.

In step 700, the function INVF 25 establishes the list of terminals Ti 11, 13 and 15 that are present within the perimeter 9, as described previously.

In step 702, this function INVF 25 acquires from each of the terminals Ti 11, 13 and 15, as state data D1Ti, the nationality of the mobile telephone operator originally managing the communications of each of the terminals Ti.

In step 704, the function INVF 25 establishes, as a first key value KVal1, an identifier of the language associated with the nationality of the operators which are most represented.

Let us suppose, for example, that the terminal T1 is operated by a German operator, T2 by a French operator and T3 by an Austrian operator. The function INVF 25 establishes as the value KVal1 an identifier of the German language as it is represented twice within the perimeter 9, whereas the French language is represented only once. In other words, the value KVal1 here designates the majority language inside the perimeter 9.

In operation 706, the function GITF 27 establishes, as the first criterion Cr1 for selecting information data, the German language. In other words, the function GIDF 27 selects the data which enable the information to be displayed in the German language.

In step 708, the function GIDF 27 sends the selected data to the distributor IDISP 3 so that the information displayed on the screen is in German. In other words, the information on the screen is displayed in the language which is in the majority within the perimeter 9.

In step 710, the function INVF 25 establishes as a second key value KVal2 for the terminal T2 13 an identifier of the French language. Optionally, this function INV 25 establishes an identifier of the German language as a value KVal 2 for the terminals T1 11 and T3 15.

The function PIDF 29 establishes a second information data selecting criterion Cr2 from the value KVal2, so that the selected data represent information in French (step 712).

In step 714, this function PIDF 29 sends the information data thus selected to the terminal T2 13, so that information regarding flights arriving at and departing from the airport is displayed on this terminal T2 13 in French. Optionally, information in the German language is sent to terminals T1 11 and T3 15.

The first Cr1 and second Cr2 criteria may be more selective, although still established on the basis of the first KVal1 and second KVal2 key values. Thus the first criterion Cr1 may be established so as to select the information data in German relating to flights departing for German-speaking countries or arriving from such countries, e.g. Austria or Germany. The distributor IDISP 3 then displays only this information. Analogously, the second criterion Cr2 may be established so as to select only information data in French relating to flights by French companies for display on the terminal T2 13.

Figure 8:
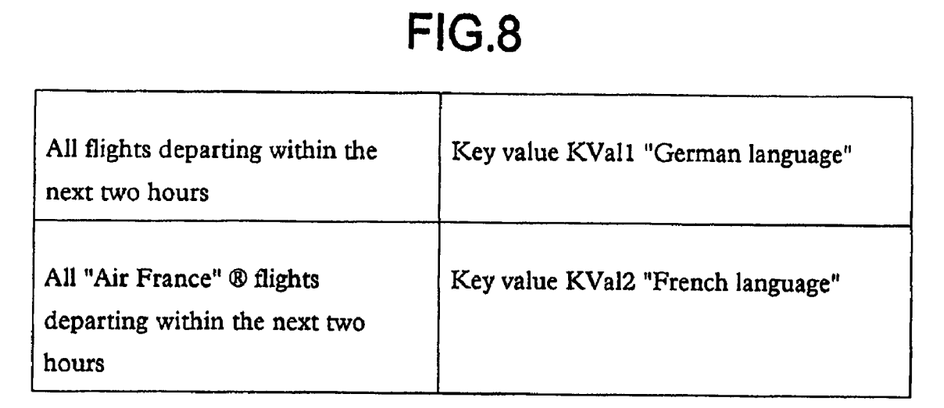
FIG. 8 is a diagram illustrating the operation of a distributor of the system shown in FIG. 1 in the embodiment shown in FIG. 7.

As shown in FIG. 8, the first Cr1 and second Cr2 criteria may be of different kinds. Thus, the criterion Cr1 causes the screen to display in German all flights from that time for the next two hours without any further distinction (first line of the table) whereas the second criterion causes the terminal T2 13 to display in French flights by the company "Air France"® only.

The system 1 is advantageously of such dimensions, as mentioned previously, as to ensure continuity of service. Thus, when there is a change to the majority language within the perimeter 9 and the language of the on-screen display changes, the terminals Ti affected immediately receive equivalent information in the language previously used for the display. If necessary, formulae (1), (2) and (3) are used to determine the dimensions of the system as a consequence.

Figure 9:
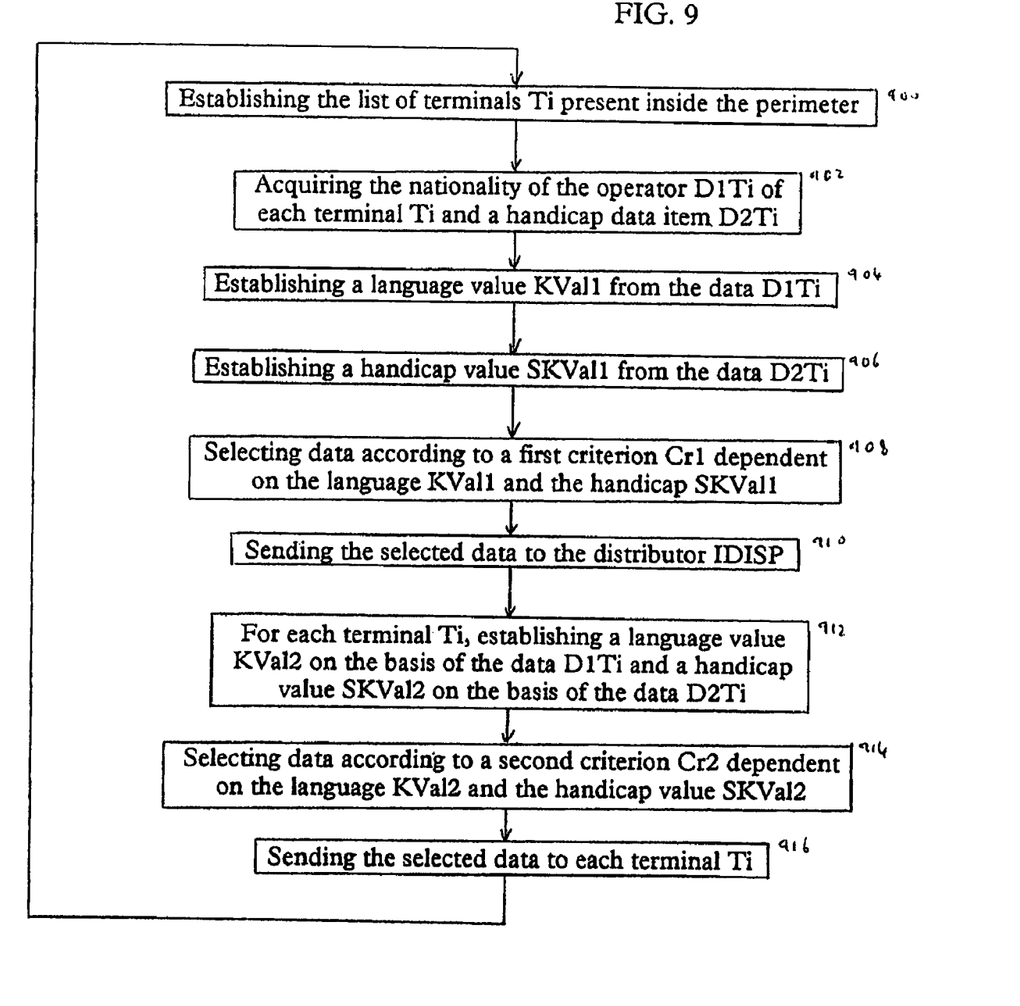
FIG. 9 is a flow chart illustrating an alternative to the embodiment in FIG. 7.

The flow chart in FIG. 9 illustrates an alternative to the first embodiment of the invention. In this alternative, the function INVF 25 acquires, as state data D1Ti, an indication of nationality and D2Ti an indication of handicap (step 902). The state data item D2Ti may assume values that indicate "no handicap", "impaired vision" or "impaired hearing".

Let us suppose, for example, that the function INVF 25 acquires from the terminal T3 15 a state data item D2T3 indicating "impaired vision", and from terminals T1 11 and T2 13 it acquires states data D2T1 and D2T2 indicating "no handicap".

The function INVF 25 establishes a first key value KVal1 denoting an indication of German language as before (step 904) and a first additional key value SKVal1 which indicates "no handicap", as being the value corresponding to the value of the state data D2Ti which are most represented within the perimeter 9 (step 906).

In step 908, the function GIDF 27 selects information data according to a first criterion Cr1 determined on the basis of both the key value KVal1 indicating German language and the additional key value SKVal1 indicating "no handicap". For example, the function GIDF 27 selects information data in German in text form.

In step 910, the function GIDF 27 sends the selected data to the distributor IDISP 3 so that the display of the distributor IDISP 3 switches into German, as before.

In step 912, the function PIDF 29 selects information data on the basis of a second criterion Cr2 which is a function of the key value KVal2 indicating "French language" and the additional key value SKVal2 indicating "impaired vision". For example, the second criterion Cr2 is established so as to select information data in French and in sound form, i.e. text read aloud and pre-recorded as audio data, for example. A device for automatically converting information data in text form into information data in audio form or an automatic reading device may be provided.

In step 914, the selected information data are sent to the terminal T2 13 for giving out, so that this information is distributed to the visually impaired user of the terminal T2 in audible form.

In this example of use, the additional key values cause a switch between visual distribution and audible distribution of a text.

In the example of the application of the invention described above, the information received by a user on his mobile terminal Ti as a function of his state data are semantically equivalent to the information distributed by the distributor IDISP 3. The difference connected with the state data is essentially concerned with the form of distribution. However, this characteristic is not currently regarded as restrictive. In the foregoing description, the equivalence relates to the information content of the data but it could also relate solely to the nature of the information without the contents remaining equivalent, or to additional information.

As described previously, the distributor IDISP 3 is capable in particular of distributing information which is selected either according to a default value or according to a majority logic. It is understood that these two selection modes may be combined. For example, after a specified period of distribution of information selected according to majority logic, the information may be selected for another specified period according to the default key value.

By modifying the selection conditions it is possible to shift at least some of the distribution of the information from the distributor IDISP 3 to the terminals Ti in order to minimise the effects of any failure of the apparatus. This shift may be voluntary and intended for example to lighten the load on the distributor IDISP 3. In some cases it may be envisaged that all the distribution functions be shifted to the terminals Ti, at least temporarily.

In the example of application of the invention described above, the system 1 is fixed. According to a second example of application, this system 1 may be mobile.

For example, the system 1 may take the form of a loudspeaker system installed in a motor vehicle and distributing pre-recorded information. The relay RLY 7, the unit CTRL 5 and the distributor IDISP 3 which comprises the loudspeakers are arranged in the vehicle. This information may be a disaster alert, for example a gas escape. All persons present within the mobile perimeter 9 can receive the disaster alert in equivalent form on their mobile terminal Ti. Thus, persons who do not understand the language in which the alert is broadcast and hearing-impaired persons can be alerted at the same time as the others.

According to a third embodiment, the system 1 is used in a museum. The guide carries the system 1 which in this case comprises a loudspeaker that plays back pre-recorded commentaries to act as a distributor IDISP 3. The guide also carries the unit CTRL 5 and the relay RLY 7. The unit CTRL 5 and the relay RLY 7 may in this case be integrated in the same housing. The visitors following the guide and unable to speak his language can receive the commentaries in audible form for example on their portable telephone. Visitors who prefer can be given a text equivalent.

According to a fourth embodiment, the system 1 is implemented along a road axis, for example on a motorway. The distributor IDISP 3 may then take the form of a signal board, for example indicating a direction, or an information board, for example indicating traffic conditions. Depending on the state data DjTi of a terminal Ti, a user may receive, in his vehicle on this terminal, data representing an equivalent, e.g. a text equivalent or possibly sound equivalent, of the signal board (for example if the signal board is written in an alphabet which the user does not read) or information board (for example if the user does not know the language in which the information is written). In the case of a vehicle travelling at low speed, WIFI technology may be used for example as short range communications technology.

In a fifth embodiment the system 1 is used in the foyer of a hotel or any other location in which pieces of music are broadcast in pre-recorded form using a sound distributor IDISP 3. The unit 5 may provide simultaneous broadcasting, through one or more relays 7, of the words of a piece being broadcast, in text form on a terminal Ti (for example a mobile telephone). In this case the distribution is advantageously provided in the form of a flux, in this case a flow of text, using methods known as "streaming". It will be understood that any distribution of this type in streamed form requires a step of storage, however temporary, in the memory 19. Alternatively, the distribution of the pieces of music may also be carried out by the "streaming" technique.

In a sixth embodiment, the system 1 is used in the reception space of a town hall in which a distributor IDISP 3 in the form of a notice board provides information, e.g. regarding the geographic location of the different administrative services. The terminals Ti may be provided in the form of a tactile text rendering device of the type that normally transcribes typographic characters into Braille characters. Other terminals Ti may also be provided in the form of Bluetooth-type earpieces. Thus, the system may provide transcription of the information from the distributor IDISP 3 for persons suffering from visual impairment.

In a seventh embodiment the system 1 is used in an outdoor urban space. Also the distributor IDISP 3 takes the form of a public display board. The unit 5 may be programmed so that each time a particular mobile terminal goes past, for example the mobile terminal T1 11, the contents reproduced on the terminal T1 are different, although always in line with the distributor IDISP 3. For example, the memory 19 of the unit 5 maintains a sequence of contents which are to be distributed on the one hand and, on the other hand, a trace of the movements of the terminal Ti using the identifier IdTi, for example. On each pass, the next element of the sequence of contents is distributed to the terminal Ti. In a first variant, a plurality of boards are provided which are connected to communicate in the manner of a distributor IDISP. Passing in front of any one of these boards causes an increment in the sequence of contents to be distributed. In a second variant, each board is connected to a particular element of the sequence of contents to be distributed and the passing of the terminal Ti close to a particular board causes individual distribution of the element of the sequence linked to said board. This embodiment can be achieved either by multiplying the distributors IDISP 3 connected to the same unit 5 or by connecting a number of systems 1 to communicate with one another, each one then being provided with a distributor IDISP 3. The data indicating that the mobile terminal Ti has passed close to a board may be kept, depending on the particular case, on a network of boards or on the mobile terminal Ti itself.

For example, the content to be distributed may consist of a series of advertising signs relating to a ready-to-wear collection, each sign representing a particular item in the collection. Thus, each time he passes in front of a sign of the type described above, the user discovers a new sign, i.e. a new item.

The state data collected by the function INVF 25 can be memorised and made available for statistical purposes. For a given perimeter 9, information may be obtained in particular as to the number of terminals Ti present as a function of the time of day, the nationalities most represented, the length of time the terminals Ti remain inside the perimeter, etc. This statistical information makes it possible to adapt the system 1. In particular it makes it possible to design the dimensions of the different elements that make up the system 1. It thus provides the data needed to solve formulae (1), (2) and (3) by indicating the predicted number N of terminals Ti to be connected. In addition, it makes it possible to establish the value of the first default key value KVal1.

In a particular case the main distributor distributes advertising. This statistical information can provide information as to the audience for the advertising. In particular it can record the impact of the advertising on people who do not speak the language in which it is presented.

According to an eighth embodiment, the distributor IDISP 3 may take the form of an advertising hoarding the display of which is modified depending on the state data collected within a perimeter provided around said hoarding. The mobile terminals Ti can thus receive information data representing for example a translation of texts displayed on said hoarding in the interface language of the terminal. They can also receive an audible equivalent of the advertising displayed when the user of the terminal Ti is visually impaired. The system according to the invention may be provided anywhere that advertising hoardings are normally provided.

Generally, the system 1 according to the invention can be used anywhere that the display of information is normally useful. In particular, the system can be used on the public highway to distribute information concerning the town, for example, such as announcements of demonstrations, the local time or any other information that is conventionally distributed by municipal information equipment.

The system 1 according to the invention may also be provided in public buildings. In these buildings, specific information is supposed to be distributed relating particularly to the location of different services. This is true, for example, of hospitals, the foyers of company premises, museums, etc. More generally, the system 1 may be provided in any public place where the display and/or audible provision of information are commonly provided.

According to a ninth embodiment the system according to the invention is provided in a restaurant. A screen can be used as a main distributor IDISP 3 instead of a menu. An equivalent of the menu, e.g. in another language, may be distributed to the mobile terminal Ti of every customer.

The embodiments and examples of applications described above are provided purely by way of example and other variants may be envisaged. For example, the function INVF 25 may establish a plurality of key values of different kinds. The nature of the state data collected from the terminals Ti may be varied and is not restricted to an indication of language or handicap that may also include information as to nationality, identity, flights, etc.

In addition to railway stations and airports the system 1 according to the invention may also be provided in toll plazas on motorways and more generally in any place where information has to be distributed.

Figure 10:
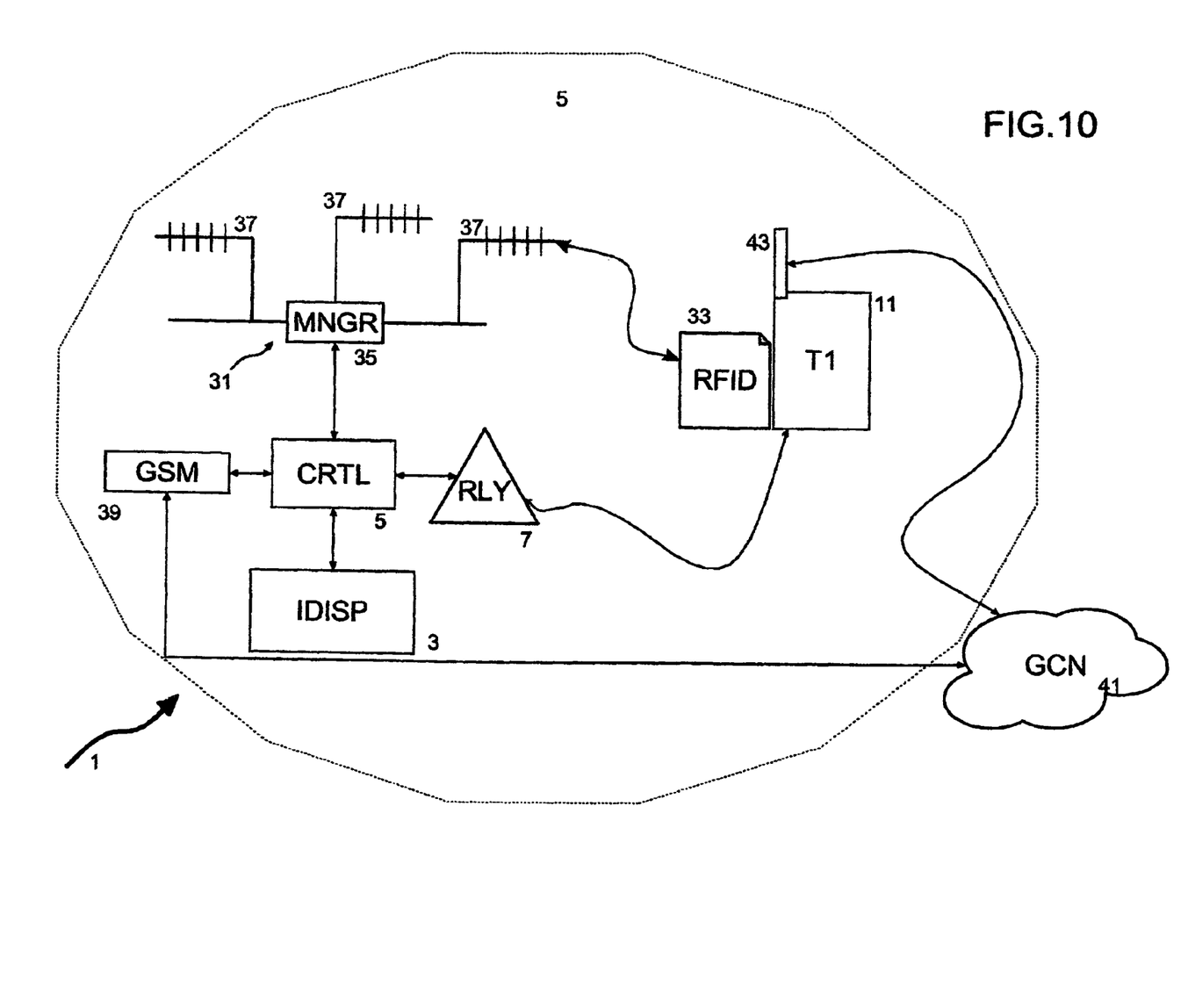
FIG. 10 is a diagram illustrating a development of the system according to the invention.

FIG. 10 illustrates an advantageous further feature of the system according to the invention. The system 1 comprises here a network for detecting radiofrequency tags 31 arranged so as to detect the entry of such a tag 33 within the collecting perimeter 9, or the departure and/or presence thereof. The detection network 31 is connected to the unit 5, for example via a communications interface (not shown). Thus the presence of a mobile terminal is detected by means of the associated radiofrequency tag 31 which is connected to it physically or otherwise.

The tags 33 here may be of the "RFID" type. More generally, what is referred to here as a "radiofrequency tag" in this description is a small portable object, passive or quasi-passive, which permanently stores a collection of bits and can be interrogated by short range radio communication. This collection of bits will hereinafter be referred to as the "memory". Other types of tags may be used, for example tags of the type known as "NFC" (from the English term Near Field Computing).

The detection network 31 comprises at least one manager 35 and at least one antenna 37 connected to it. The antenna 37 is capable of reading the data contained in the memory of a radiofrequency tag 33 situated within its range. The manager 35 is connected to the unit 5, for example via the above-mentioned communications interface.

The manager 35 may comprise, for example, an RI-CTL-MB2A controller of series S2000 manufactured by Texas Instruments and RF-MOD-TX8A multiplexers manufactured by the same company.

Figure 11:
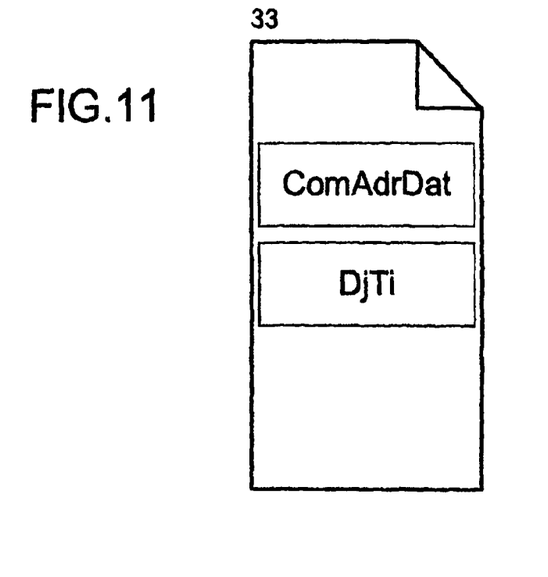
FIG. 11 is a diagram illustrating a tag which can be used in the embodiment in FIG. 10.
Figure 12:
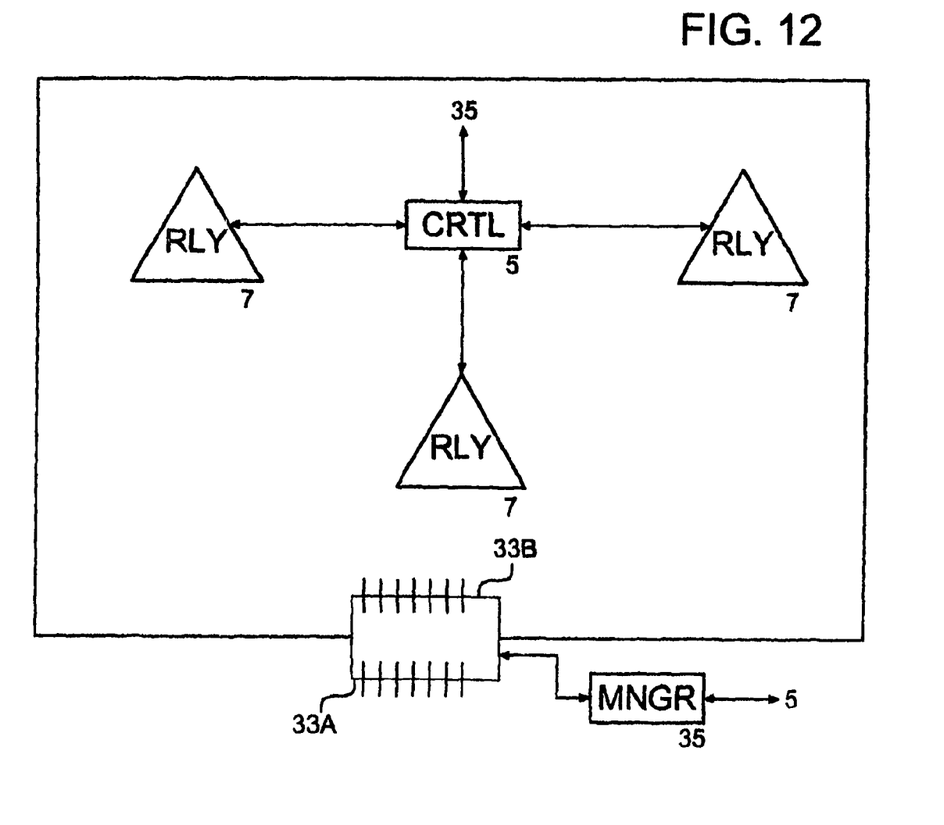
FIG. 12 is a diagram illustrating a particular embodiment of the development in FIG. 11.

As shown in FIG. 12, the memory of the tag 33 stores a set of state data DjTi, for example a data item D1Ti identifying the language currently being used by the user of the terminal Ti, or any other state data item described above.

In addition, the memory of the tag 33 stores communication address data ComAdrDat relating to the mobile terminal Ti. These data ComAdrDat comprise in particular a contact address for the mobile terminal Ti via the relay RLY 7. This may be, for example, a material address of the communications interface: the material address of a Bluetooth interface, if the relay RLY 7 is operating by this technology. If applicable, the identifier IdTi of a mobile terminal may be deduced from these data AdrComDat.

Preferably, the data ComAdrDat and the state data DiTj are stored in the same tag, reserving bit areas for these different data. This allows in particular simplified reading of the different data, as a single tag can be read by an antenna 33. The data ComAdrDat and DjTi thus form the same code word.

The tag 33 is arranged on an object carried by the user of a mobile terminal Ti, for example by the user of terminal T1 11. The portable user object may take the form of a card, for example resembling a credit card. The mobile terminal Ti may act as a portable object in the sense that the tag 33 may be integral with the terminal Ti. The tag may be self adhesive so that it can be placed on any substrate at the user's discretion, for example on the terminal Ti.

When a tag 33 is detected by an antenna 37, the function INF 25 described above interacts with the interface for connection with the manager 35 in order to obtain all the state data DjTi contained in the tag.

This feature of the invention can be implemented in each of the examples of application of the invention described previously. The addition of the tag detection network 31 has the advantage of speeding up the phase of discovery or inventory of the mobile terminals Ti present within the perimeter 9, because a terminal is detected immediately as soon as the tag carried by the user is read by an antenna 37.

In a particular embodiment illustrated by FIG. 12 of the feature according to the invention, the perimeter 9 is accessible only through obligatory identified pass-through points. In this case an entry/exit detector connected to the manager is advantageously provided at each of these pass-through points. A detector of this kind comprises, for example, two rows of antennas 37A and 37B arranged at said pass-through point, parallel to one another and transversely with respect to the direction of movement. Thus the direction of movement of a tag 33 can be detected: when the row 37A detects a tag 33 in front of the row 37B the direction of movement is from antenna 37A towards antenna 37B, and vice versa. Advantageously, so called "flexible" antennas are used which can follow the contour of a support, e.g. flexible antennas on plastic film of the CIPAM CIP_ANT-LF type.

This is particularly advantageous as the user tags 33 are read on entering a location. Moreover it is possible to detect their departure, so that it is easy to know at any given time which terminals Ti are present within the perimeter 9.

This particular embodiment also avoids the distribution of antennas 21 over the entire operating zone 5. Although in FIG. 12 the perimeter 9 is shown by solid lines it should be realised that this perimeter is not necessarily physically closed.

It may also be advantageous to arrange a number of relays RLY in a network so as to cover substantially all the space delimited by the perimeter 9, as shown in FIG. 12.

Optionally, the unit 5 is also connected to an access interface 39 to a global communications network 41 of the wired or wireless type, such as GSM, GPRS, EDGE, UMTS, IP or the like.

This access interface 39 allows the unit 5, on the one hand, to access remote data processing means which are suitable for example for carrying out additional data processing or material resources which are away from the perimeter 9.

On the other hand, the access interface 39 makes it possible to establish communication with mobile terminals Ti 11 which have related global communications means 43, i.e. of the cellular network type, for example, GSM, GPRS, EDGE, UMTS or the like. This makes it possible in particular to establish communication with a mobile terminal Ti 11 of the standard portable telephone type for delivering sorted data. In this case the data ComAdrDat advantageously comprise a call number for a mobile terminal through the cellular network. For example, distribution in the form of an SMS (text message) or MMS (multimedia message) may be provided.

The tag 33 is advantageously of the type known as a passive tag, i.e. the tag 33 has no autonomous energy or processing capacity. It is nevertheless capable of responding to an interrogation request by sending a message containing the data stored in its memory. The energy needed for this activity is drawn from the induction current of the signal from the interrogation apparatus, in this case the antennas 37. This design means that the system is free from energy constraints and the weight that this implies.

It will be understood, however, that active tags, i.e. those which have their own energy source, could be used provided that they operate in passive mode, i.e. they are restricted to responding to an interrogation signal.

By way of example, it is possible to use tags known as TITIS RI-TRP-W4FF manufactured by Texas Instruments.

The communication address data ComAdrDat may form a user identifier, for example at the controller 5. In certain cases the communication address data ComAdrDat may be completed or replaced by a user identifier of this kind in the actual tag 33.

Alternatively, the data ComAdrDat and DjTi may be stored in different tags, particularly when the capacity of the memory of a single tag 33 is not sufficient. These data ComAdrDat and DjTi thus form several code words (or a set of codes). If the relay RLY operates simultaneously using different technologies, the data ComAdrDat may also comprise a data item identifying a particular communication technology preferred by the user of the terminal Ti.

Preferably, the detection network 31 comprises a plurality of antennas 37 connected to the manager 35.

Various Arrangements (not Shown) of the Antenna or Antennas 37 May be Envisaged:

The detection network 31 may have a single antenna 37 connected to the manager 35. The presence of a tag 33 at a particular point inside the perimeter 9 can be detected. The data contained in the memory of the tag 33 can only be read at this particular point within the perimeter 9.

The detection network 31 may comprise a plurality of antennas 37 connected to the manager 35 and distributed so as to cover an area. In particular, the antennas 33 may be distributed so that a tag 33 can be read at any point inside the perimeter 9 or they may be distributed along the perimeter 9.

The detection network 31 may comprise a plurality of managers 35, particularly when the maximum number of antennas that can be connected to a single manager 35 is reached.

For more details relating to the description of FIGS. 10 to 12 and the operation of the detection network 31, reference may be made to French Patent Application No. 0601031 filed on 6 Feb. 2006 by the present Applicant, which is hereby incorporated by reference, to all intents and purposes.

According to an embodiment of the development of the invention, the system 1 is used in the form of a system of simultaneous translation, for example for a room in which a conference is held.

Each participant is given a card bearing a tag of the RFID type when they register. This tag stores information, in the form of state data, which the participant has provided on registration, for example. In particular, these state data can identify the languages spoken by the participant.

Each participant who wishes to make use of a simultaneous translation service has an earpiece of the Bluetooth type, for example, the address of which is stored in the RFID tag on the card. This may be an earpiece of his own or lent to him for the occasion.

The conference room is provided with Bluetooth access points connected to the unit CRTL 5 by a local network, for example of the IP network type (IP standing for "Internet Protocol"). The unit CRTL 5 at least temporarily stores in its memory 19 the translations of the presentation by the speaker into different languages offered to the listeners. In the particular case of temporary storage the memory 19 acts as a buffer (i.e. a buffer memory).

The distribution of the Bluetooth access points within the room is such that anyone equipped with a Bluetooth earpiece can listen to the conference which is distributed by streaming in the language of their choice.

More precisely, the presentation given by a speaker can be digitised and sent to a contents server (not shown) using protocols of the RTSP and RTP type, for example. Similarly, interpreters can provide the translations and feed these translations into the contents server. The contents server may be integrated in the unit CRTL 5. This contents server may also be located outside the unit CRTL 5, provided that there is a data link, for example of the IP type, between the contents server, the unit CRTL 5 and the computer charged with digitising the presentation given by the speaker. The contents server may be located outside the conference room.

The unit CRTL 5 may receive from the contents server different streams each corresponding to a particular translation. This may be carried out after a request from the unit CRTL 5, for example a request using the RTSP protocol (namely the "Real Time Streaming Protocol"). The unit CRTL 5 can thus store in the memory MEM 19 (in particular put into its buffer) the different streams received, for example using the RTP protocol ("Real time Transport Protocol"). This storing may take place more precisely in the table Dat-Tab 28 of the memory 19.

The unit CRTL 5 sends the corresponding translated stream to the Bluetooth earpieces, as a function of the state data of the RFID tag detected by the network 31. This transmission may also be based on the RTP protocol.

The conference rooms that offer simultaneous translation may be organised as shown in FIG. 12.

This translation service may also use means other than the interaction between the detection network 31 and the radiofrequency tags 33 to acquire the state data.

The translation service described can be used in performance spaces such as cinema auditoria, theatres and the like. In the particular case of it being used in a theatre auditorium a multi-speaker system is used.

This translation service avoids the need to equip the conference room with a conventional simultaneous translation service, which is a complicated and expensive operation, particularly in terms of the deployment of equipment. In fact, it is conventionally necessary to provide, for each listener, a desk fitted with a headset and a key pad by which they can select the language in which they would like to listen to the conference. In addition, all the desks have to be connected to the location where the translators produce the translations of the speaker's presentation.

The invention may also be defined as a process.

The invention is not limited to the embodiments described above solely by way of example but encompasses all the variants that may be envisaged by the skilled man within the scope of the claims that follow.

The invention claimed is:

1. System for distributing information (1), comprising:
   at least one main distributor (3), and
   a control unit (5) capable of distributing, through the main distributor (3), selected information drawn from selected stored data (19) according to at least one first criterion dependent on a first key value, characterised in that it further comprises a short range communications relay (7) associated with a physical perimeter (9) and capable of establishing connections within this perimeter (9) with mobile terminals (11, 13, 15) equipped with homologous short range communication means, in that the control unit (5) comprises an interface (23) with this communications relay (7) as well as a control module (17) designed to carry out functions (25, 27, 29) which affect both the physical perimeter (9) and the main distributor (3), these functions comprising:
   a general distribution function (27) to the main distributor (3),
   an inventory function (25) capable of reacting to the presence of mobile terminals (11, 13, 15) within said perimeter (9) while storing respective state data gathered from the mobile terminals (11, 13, 15) and of establishing a second key value as a function of a subgroup of state data, and
   a particular distribution function (29) capable of sending, towards the mobile terminal or terminals (11, 13, 15) having state data of the subgroup, selected information drawn from selected stored data (19) according to a second criterion depending on the second key value.

2. System according to claim 1, characterised in that the inventory function (25) is arranged so as to store the state data by assigning them to mobile terminal identifiers gathered from the mobile terminals (11, 13, 15) present within the perimeter (9).

3. System according to claim 1, characterised in that the inventory function (25) is arranged so as to establish at least one subgroup of state data according to a majority logic.

4. System according to claim 3, characterised in that the inventory function (25) is capable of establishing a modified first key value used by the general distribution function (27) on the basis of a subgroup of state data.

5. System according to claim 4, characterised in that the general distribution function (27) is capable of conditionally replacing the first modified key value with a first default key value.

6. System according to claim 1, characterised in that the first criterion and the second criterion differ only in the key value.

7. System according to claim 1, characterised in that the first criterion and second criterion depend respectively on a first additional key value and a second additional key value.

8. System according to claim 7, characterised in that the inventory function (25) is capable of establishing the second additional key value as a function of the subgroup of state data.

9. System according to claim 7, characterised in that the additional key values are capable of causing switching between a visual distribution and audible distribution of a text.

10. System according to claim 1, characterised in that the first key value on which the first criterion depends comprises a language identifier.

11. System according to claim 1, characterised in that the state data comprise data which determine an operating language of the mobile terminal (11, 13, 15).

12. System according to claim 1, characterised in that the state data comprise data that characterise the user of the mobile terminal (11, 13, 15) as being visually impaired.

13. System according to claim 1, characterised in that the state data comprise data that characterise the user of the mobile terminal (11, 13, 15) as being hearing-impaired.

14. System according to claim 1, characterised in that the short range communications relay (7) conforms to the Bluetooth standard.

15. System according to claim 1, characterised in that the main distributor (3) comprises at least one public display unit.

16. System according to claim 1, characterised in that the main distributor comprises at least one public sound reproduction system.

17. System according to claim 1, characterised in that the information distributed comprises information relating to departures or arrivals of transport means.

18. System according to claim 1, characterised in that it further comprises a detection network (31) capable of interacting with at least one portable object (33) in order to acquire at least one coded word from such a portable object, said code word comprising at least one state data item.

19. System according to claim 18, characterised in that the control unit (5) is arranged so as to interact with the detection network (31) in order to memorise the code word acquired, at least temporarily, and then implement a decision mechanism in which the decision to send said selected information and/or a transmission address for said selected information depend at least partly on the code word stored.

20. System according to claim 18, characterised in that the code word comprises a representation of a call address for a mobile terminal (11, 13, 15).

21. System according to claim 18, characterised in that the detection network (31) is implanted as an access control to a spatial zone covered by the communications relay (7), so that after interaction between a portable object (33) and the detection network (31) when said access control is passed, communications between the communications relay (7) and at least one mobile terminal (11, 13, 15) are permitted over substantially the entire spatial zone for transmitting said selected information.

22. System according to claim 18, characterised in that it further comprises a communications interface with a global communications network, interacting with the control unit (5) to send said selected information to at least one mobile terminal via said global communications network.

23. System according to claim 22, characterised in that the unit (5) is arranged to send said selected information either by short range communication or through said global communications network, as a function of said code word.

24. System according to claim 18, characterised in that the portable object (33) comprises at least one radiofrequency tag.

25. System according to claim 1, characterised in that the control unit is arranged so as to interact with a contents server capable of delivering the selected information.

26. System according to claim 1, characterised in that the selected information coming from said contents server is stored at least temporarily in the memory (19) of the control unit (5).

* * * * *